United States Patent [19]

Jeffers et al.

[11] 4,277,806
[45] Jul. 7, 1981

[54] MAGNETIC RECORDING USING RECORDING MEDIA HAVING TEMPERATURE DEPENDENT COERCIVITY

[75] Inventors: Frederick J. Jeffers, Escondido; Richard J. McClure, San Diego, both of Calif.

[73] Assignee: Eastman Technology, Inc., Rochester, N.Y.

[21] Appl. No.: 39,019

[22] Filed: May 14, 1979

[51] Int. Cl.³ .............................................. G11B 5/86
[52] U.S. Cl. ...................................... 360/16; 360/17; 360/131
[58] Field of Search .................... 360/16, 17, 15, 131, 360/134; 346/74.1

[56] References Cited
U.S. PATENT DOCUMENTS

| | | | |
|---|---|---|---|
| 3,827,077 | 7/1974 | Kobilka | 360/16 |
| 3,913,131 | 10/1975 | Kitamoto et al. | 360/17 |
| 3,921,208 | 11/1975 | Chapman | 360/17 |

FOREIGN PATENT DOCUMENTS 52-58513  5/1977  Japan .
1440514  6/1976  United Kingdom ...................... 360/16

*Primary Examiner*—John H. Wolff
*Attorney, Agent, or Firm*—Donald W. Strickland

[57] ABSTRACT

A magnetic recording which is useful as a mirror image duplication video tape master is made from another magnetic recording by anhysteretic transfer at a temperature at which the coercive force of the master is much less than the coercive force of the other recording. Preferably, the magnetic recording layer of the master comprises fine particles of a manganese bismuth alloy, the coercivity of which decreases with decreasing temperature, and the other record comprises a magnetic recording layer having a coercivity which increases with decreasing temperature. The master record may subsequently be used to duplicate copies of the recording by anhysteretic transfer to a copy record having a coercive force which, at the temperature at which the transfer is made (typically room temperature), is substantially lower than the coercive force of the master.

15 Claims, 3 Drawing Figures

MAGNETIC RECORDING USING RECORDING MEDIA HAVING TEMPERATURE DEPENDENT COERCIVITY

BACKGROUND OF THE INVENTION

The present invention relates to magnetic recording and particularly to methods for duplicating magnetic records.

More particularly, this invention relates to methods for duplicating magnetic video records, such as may be recorded on magnetic tapes and discs.

There has existed for some time the need to make duplicate video recordings which provide high quality pictures when played back and yet are producible at low cost. The quality of the pictures depends in large measure on the strength of the signal which is recorded on the copy. The cost of the copy depends upon the complexity of the duplication technique and the time required to duplicate each copy. In the case of video magnetic records the problem is complicated by the need for recording magnetic signals on high coercivity materials (typically at least 300 to 500 Oersteds (Oe)) and at short wavelengths (typically about 1 $\mu$m (micrometer). The coercivity of the tape is the ability of the tape to resist demagnetization.

One technique for duplicating video magnetic recordings is to merely play back the original magnetic signals and simultaneously re-record such signals, using a conventional magnetic head, onto a copy. The main limitation of this technique is that the rerecording takes place at the same speed as the original recording, i.e. a one hour program takes one hour to copy. The process is quite time consuming and, hence, costly.

The process of anhysteretic transfer has been examined with the view to reducing the time needed to make the copies. In anhysteretic transfer the master record and the copy are placed in face-to-face contact in the presence of an AC magnetic field. The AC field causes the magnetization pattern on the matter to transfer to the copy. In order to prevent the master record from being erased, the transfer field cannot exceed the coercive force of the master. Thus, the magnetic signal intensity on the copy is limited by the coercivity of the master. U.S. Pat. No. 3,913,131 proposes a technique for overcoming this limitation; namely, to effect anhysteretic transfer between the master and the copy at low temperatures where the coercive force of the master increases to a greater extent than the coercive force of the copy. A gain in differential coercive force of the master with respect to the copy of about 2.5 times is indicated in the patent to be obtained at low temperatures (e.g. 233 K).

In order to use the aforedescribed technique to duplicate magnetic tapes bearing slant track recordings, as is characteristic of conventional video tapes, it is necessary that the magnetic signals on the master be a mirror image of the signals which are to be anhysteretically transferred to the copy material. To produce such mirror image signals on the master, the aforementioned patent suggests using a special video recorder which records an inverted image of the signal presented to it. Such recorders tend to be costly and add significantly to the overall duplication costs. Also, like other conventional recording machines using magnetic heads, the intensity of the signals recorded by these recorders is limited because the heads used to record the signals on a magnetic material of relatively high coercivity tend to saturate at the high field levels required. Finally, the process described above requires that the master and each final copy be cooled to low temperatures so that the amplified transfer can be effected. This slows the process and, hence, increases the cost of the final copy. Thus, the problem of providing at low cost a magnetic master of very high coercivity at room temperature still remains.

There has been mentioned in the literature magnetic materials made of manganese bismuth (MnBi) particles of small dimensions (smaller than one micrometer ($\mu$m)). Such materials exhibit a unique coercivity vs. temperature characteristic, viz., a coercivity which is exceptionally high, say 16,000 Oe at room temperature, and which drops dramatically to a moderately low coercivity, say 300 Oe, at 77 K, the temperature of liquid nitrogen. See, for instance, Kishimoto and Wakai, J. Appl. Phys. 48, 4640 (1977). This material has been suggested for use in a magnetic tape which is recorded at relatively low temperatures (e.g. between 170 K and 200 K) (see Japanese Patent Publication No. 134593, published on May 14, 1977).

SUMMARY OF THE INVENTION

A primary object of this invention is to provide magnetic records for use in the duplication of magnetic recordings, particularly video recordings, thereby providing such duplicate recordings with high magnetic signal strength and in less time and at lower cost than has been accomplished in the past.

Another object of the present invention is to provide an improved magnetic record which may be used as a master record in making duplicate magnetic recordings by anhysteretic transfer of the magnetic signals to the copy record at room temperature.

A further object of the present invention is to provide improved methods of duplicating video magnetic recordings.

Still another object of the present invention is to provide an improved method of duplicating magnetic records and to provide improved duplicate records in which the signals have higher intensity than are contained in magnetic records produced by conventional duplication techniques.

Briefly described, the method of making copies of a first or original magnetic record in accordance with the invention comprises the steps of anhysteretically transferring the magnetic signals recorded on the original record to a master magnetic record, and then anhysteretically transferring magnetic signals from the master to the magnetic recording layer of a copy. The magnetic recording layer of the master is characterized by a coercive force which, relative to the coercive force of the original's recording layer, decreases dramatically with decreasing temperature. Preferably, the master's recording layer comprises submicron (i.e. less than 1 micrometer) sized particles of MnBi alloy, and the original's recording layer comprises cobalt-doped $\gamma$-Fe$_2$O$_3$.

The first anhysteretic transfer step is carried out at a low temperature (e.g. 85 K) where the coercive force of the master's recording layer is substantially lower (e.g. by an order of magnitude) than that of the original. Preferably, an AC magnetic field is used to effect transfer of signals from the original to the master, and this transfer field is three to ten times greater than the coercive force of the master at the transfer temperature. This high transfer field can provide an increased perpendicular component of magnetization in the master which results in a magnetic signal of increased level. A theoretical basis for this gain is described by Mallinson, *Trans. IEEE*, Vol. Mag. 9, 678 (1973).

As a result of the first anhysteretic transfer step, the master receives an inverted or mirror image of the magnetic signals on the original record. Following this first transfer step, the temperature of the master is increased to a temperature, say, room temperature, at which the coercivity of the master's recording layer is more than ten times the coercivity of the recording layer of the copy and can be 30 to 40 times the coercivity of typical copy materials. The second anhysteretic transfer step is effected at this increased temperature, and the copy receives a non-inverted image (i.e. a recording having the same orientation as the original record). Again, during the second transfer, an AC transfer field may be used, such field being far greater, e.g. three to ten times greater, in intensity than the coercive force of the copy's recording layer, and again gain results from the transfer and the copy is produced at the highest effective magnetic signal level it can support. This level may be much higher than can be obtained by means of re-recording with conventional magnetic heads directly on the copy. Since the final anhysteretic transfer step may be accomplished at rates far greater than the rate at which the magnetic signals were recorded on the original, the copies can be produced at high speeds and low cost.

As indicated above, the master per se preferably comprises a layer containing submicron sized particles of MnBi having mirror image signals recorded thereon by an anhysteretic transfer step. Such a master is unique and plays a major role in the production of high quality copies according to a preferred embodiment of the invention. Owing to the exceptionally high coercivity (16,000 Oe or more) of the MnBi master at room temperature, the recorded signals are vitually permanent. Accordingly, this master, as well as the copies made from it, are considered as a major feature of this invention.

The foregoing and other objects and advantages of the invention, as well as presently preferred embodiments thereof and the best mode now known for practicing the invention, will become more apparent from a reading of the following detailed description in connection with the accompanying drawings.

DESCRIPTION OF PREFERRED EMBODIMENTS AND BEST KNOWN MODES

Figure 1:
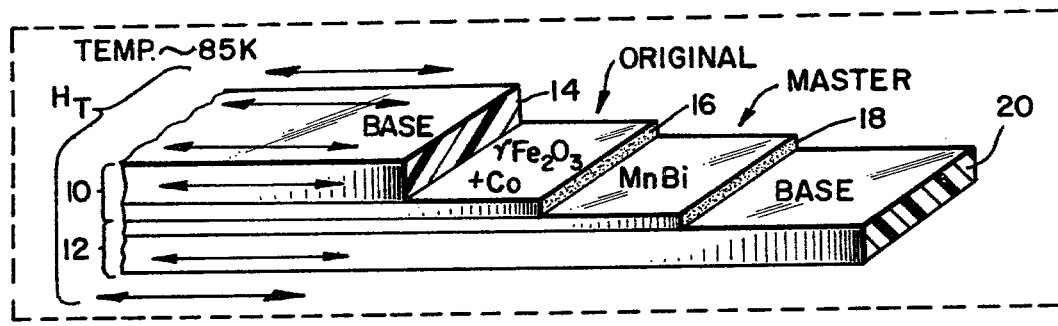
FIG. 1 is a fragmentary perspective view illustrating an improved master record in accordance with the invention during a step in the process of making the same.

Referring now to FIG. 1 there is shown an original or first magnetic record 10 and a mirror or inverted image master record 12 which is made therefrom by anhysteretic transfer in the presence of an AC magnetic field indicated as $H_T$. The records 10 and 12 are shown as magnetic tapes. It will be understood, however, that other types of magnetic records may be used, such as those of the disc variety. The original tape 10 has a flexible base or substrate 14 to which a magnetic recording layer 16 is adhered. Similarly, the master tape 12 comprises a magnetic recording layer 18 which is supported by a base or substrate 20. The bases 14 and 20 are desirably of the same material such as polyester. It is desirable that the bases be of the same material so as to have like thermal expansion and contraction characteristics to prevent slippage or skew between the records while being cooled to low temperatures.

During the transfer step, the layers 16 and 18 are arranged in face-to-face relationship. The dash line represents a chamber which is maintained at low temperature while the transfer is taking place. This temperature is preferably the temperature of liquid nitrogen (approximately 77 K). The symbol "K" represents degrees on the Kelvin scale. The tapes 10 and 12 may be wound in a bifilar manner. During a second anhysteretic transfer step (described hereinbelow) when copies are made from the master, the master may be wound in a bifilar manner with the copy, the copy being on the same side of the master as was the original tape 10 when the master was made. In this manner any stretching of the tape will be compensated. During both anhysteretic transfer steps, the AC transfer fields $H_T$ are applied for a short period of time, say a few seconds (at least 10 to 15 cycles).

Figure 3:
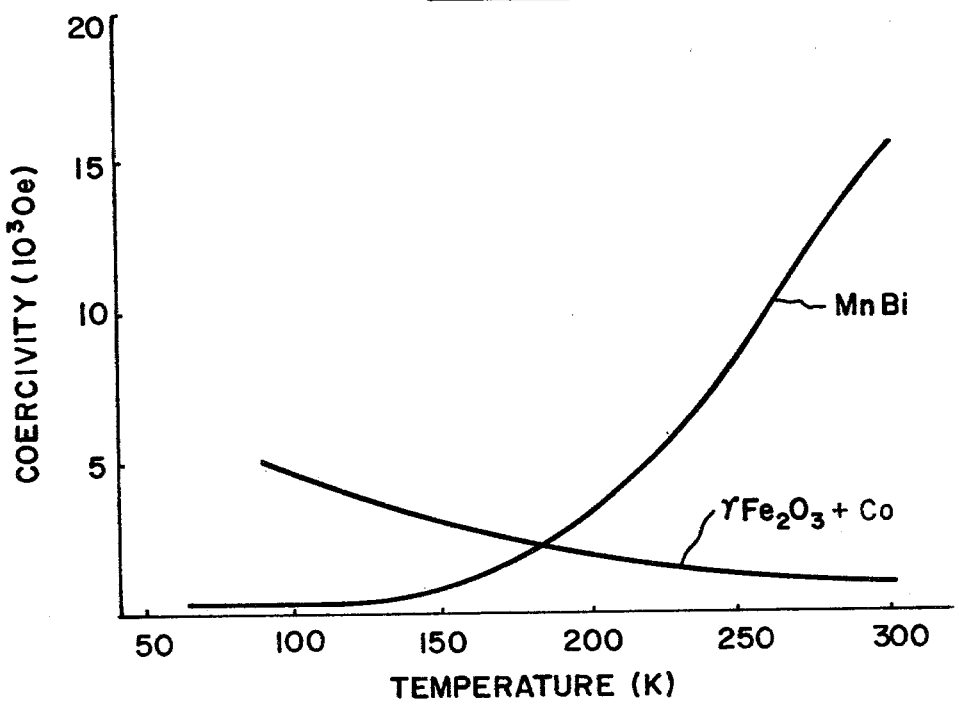
FIG. 3 shows the temperature-coercive force characteristic of particular MnBi and cobalt-doped $\gamma$-$Fe_2O_3$.

The original tape 10 may be recorded in the conventional manner, that is with a magnetic head. In the case of video recording, a conventional video recorder may be used. Preferably, the recording layer 14 of the original tape 10 has a coercive force which increases with decreasing temperature. Suitable recording layers for the original tape 10 are those which comprise one of the following magnetic materials: $\gamma$-$Fe_2O_3$ heavily doped with cobalt; $Fe_3O_4$ also heavily doped with Co and with cubic anistropy; $CrO_2$, and certain particles, such as the iron particles disclosed by A. A. Van Der Geissen in an article entitled "A Magnetic Recording Tape Based on Iron Particles," IEEE Transactions on Magnetics, Vol. Mag. 9, No. 3, P. 191 (September 1973). The Co-doping in the iron oxide tapes (viz., the tapes containing $\gamma$-$Fe_2O_3$ and $Fe_3O_4$ in their recording medium) may be in the range of 1% to 20% by weight. At the present time, $\gamma$-$Fe_2O_3$ which is doped with Co is preferably used since the coercive force thereof increases from about 500 Oe at room temperature to about 5,000 Oe at 85 K. The temperature vs. coercive force characteristic is shown in FIG. 3.

The master tape 12 comprises a recording layer of fine particles of MnBi which may be prepared by the methods described in the above referenced article in the Journal of Applied Physics and/or Japanese Patent Publication. By way of further example, the MnBi material may be made from MnBi alloy wherein the alloy is in the ratio of 5 to 6 moles Mn to 4 to 5 moles Bi, with the ratio 5.5 moles Mn to 4.5 moles Bi, being presently preferred. The material is ground. Such grinding can be carried out by hand with the aid of a pestle and mortar. The ground material is then passed through a No. 80 mesh sieve. The particles resulting from the grinding are of an average size of 10 $\mu$m. When the size of the particles is mentioned herein, it is intended to denote the maximum dimension (e.g. maximum diameter) of the particle. The particles are then ball milled for from 24 to 32 hours. Milling can take place in a mill with $Al_2O_3$ rollers in methyl isobutyl ketone, with the MIBK covering the rollers. The milling results in particles having an average size less than one μm (micrometer) with particles of average size 0.33 μm being preferred. The particle size may be verified by scanning electron microscope pictures.

The MnBi particles are then placed in a binder. A partially hydroxylated polyvinyl chloride-vinyl acetate binder is preferred. In the binder the MnBi particles may comprise as much as 55% by volume (35% by volume typical). For example, this coating material may be made by combining 406 grams of MnBi powder with 48.4 grams of the binder and 3.2 grams of a stabilizer. An octyl epoxy stearate is used as the stabilizer. The binder can be obtained from Union Carbide (Tradename VAGH) and the stabilizer from Argus Chemicals (Tradename DRAPEX). The coating is made on the polyester base 20 (FIG. 1) by means of a doctor blade. The average thickness of the coating is preferably about 0.35 mils. The coating is preferably calendered. After coating and before drying, the magnetic record medium may be aligned at room temperature by means of an external alignment field. The alignment is in the same direction as the alignment of the record medium layer 16 of the original tape 10, which may be longitudinal. The coercivity vs. temperature characteristic of submicron particles of MnBi is shown in FIG. 3.

In order to make the master, the tapes 10 and 12 are placed in contact, as by bifilar winding them together in the manner described above. The transfer field $H_T$ may be transverse or longitudinal (as shown in FIG. 1) with respect to the tape's longitudinal axis. After a few seconds in the transfer field, a mirror image of the magnetization pattern on the original tape 10 is transferred. The transfer field intensity is desirably three to ten times the coercive force of the recording medium of the layer 18 on the master tape 10 at the transfer temperature. In the example given, where the original tape 10 has a coercive force of 5,000 Oe at 85 K while the master 12 has a coercive force of 300 Oe, the transfer field is preferably about 3,000 oersteds or ten times the coercive force of the master 12. Transfer may be effected at higher temperatures, in which case the transfer field intensity may be less. For example, at 170 K the coercive force of the master is approximately 2,000 Oe. Then, the maximum transfer field is used which will prevent erasure of the original tape 10. At the preferred temperature of 85 K, the transfer field of 3,000 Oe is much less than the coercive force of the original record 10 and far more than the coercive force of the MnBi master 12. This will avoid master knock-down and transfer will be essentially complete. At 85 K, the saturation flux density in the original is higher than the saturation flux density at room temperature. Also, at 85 K, the coercive force of the original 10 is very high compared with any possible self-demagnetization field so that the remanent flux density after anhysteretic transfer will be essentially the same as would be detected by a read head from the original tape at the same position where transfer takes place. The magnetization is therefore transferred essentially intact from the original 10 to the master 12. Since the field from the original 10 is essentially a rotating vector, a rotating vector magnetization pattern (of course a mirror image of the pattern on the original 10) is transferred to the master 12. The field intensities are such that the transfer results in gain in the intensity of the signal transferred. The theoretical basis of such gain is described in the article by Mallinson referenced above.

Figure 2:
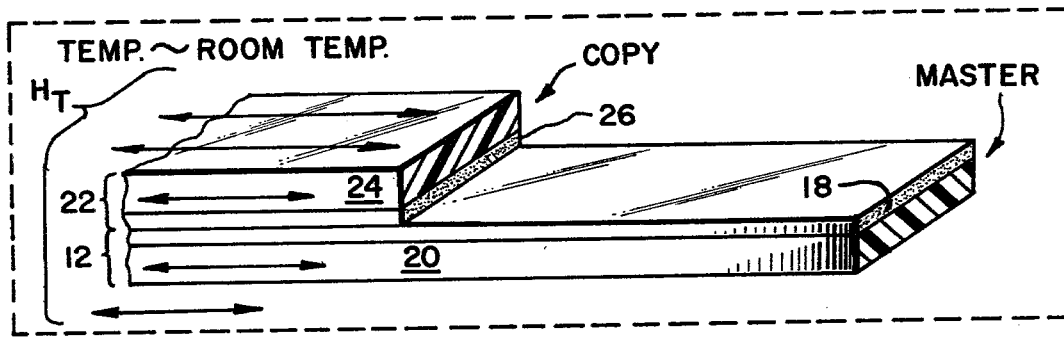
FIG. 2 is a fragmentary perspective view showing the master record in a step of the process of making duplicate records.

Now referring more particularly to FIG. 2 the transfer of the magnetic signals from the master 12 to a copy 24 is carried out at approximately room temperature, say 300 K. Temperatures between 200 K and 300 K may be used. At room temperature, which is the preferred temperature, the coercive force of the master is exceptionally high, being about 16,000 Oe or more. The copy preferably comprises a polyester support 25 having a magnetic recording layer 26 disposed thereon. The recording layer 26 may be the same as that of the original 10. However, $Fe_3O_4$ with cubic anisotropy is preferred since it has a high coercive force at room temperature of approximately 1,000 Oe and will support high intensity magnetic signals. At room temperature the master is essentially unerasable. A transfer field $H_T$ longitudinally aligned may be used, but the $H_T$ direction is not critical. This field intensity may be three to ten times, and preferably ten times or more, the coercive force of the copy record 24. Gain results from the transfer as was described above. By bifilar winding the master and the copy in the same sense as was done during the transfer to the master 10 as explained above in connection with FIG. 1, any stretching of the tapes is compensated for. The final transfer occurs at room temperature and takes only a few seconds; thus, high quality (high magnetization intensity) magnetic records (suitable for video playback) may be produced in a short period of time and at low cost.

From the foregoing description, it will be apparent that the magnetic recording art has been improved by new magnetic records and recording techniques which are especially suitable for duplication of video magnetic records. The presently preferred embodiments and best modes of practicing the invention have been described. Variations and modifications of such embodiments and modes within the scope of the invention will undoubtedly suggest themselves to those skilled in the art. The foregoing description should therefore be taken as illustrative and not in a limiting sense.

What is claimed is:

1. A duplicate magnetic record having magnetic signals recorded thereon corresponding to the magnetic signals previously recorded on the magnetic layer of an original magnetic record, said duplicate magnetic record being produced by the process of:
    (a) anhysteretically transferring magnetic signals from the original magnetic record to a master record having a magnetic recording layer comprising submicron particles of MnBi dispersed in a binder, whereby an inverted mirror image of said magnetic signals is formed on the recording layer of said master, said anhysteretic transfer being effected at a first temperature at which the coercivity of the recording layer of the original is between three and ten times greater than the coercivity of the recording layer of the master; and
    (b) anhysteretically transferring, at a second temperature of the order of room temperature which is substantially higher than said first temperature, magnetic signals from the master record to a duplicate magnetic record having a magnetic recording layer with a coercivity, at said second temperature, which is at least ten times lower than the coercivity of the recording layer of the master record.

2. The invention as set forth in claim 1 wherein said first temperature is a temperature below about 170 K.

3. The invention as set forth in claim 1 wherein said MnBi is an alloy in which the ratio of Mn to Bi is from 5 to 6 moles Mn to from 4 to 5 moles Bi.

4. The invention as set forth in claim 1 wherein the magnetic recording layer of said duplicate record contains $Fe_3O_4$ with cubic anisotropy.

5. The invention as set forth in claim 1 wherein said anhysteretic transfer between said master record to said duplicate record is carried out with an AC magnetic field having an intensity which is 3 to 10 or more times the coercive force of the recording layer of said duplicate record.

6. The method of making copies of a first magnetic record which comprises the steps of:
   (a) anhysteretically transferring the magnetic signals on said first magnetic record to a master magnetic record to provide on said master record signals which are mirror image inverted with respect to the signals on said first record, said master record having a coercive force which decreases with decreasing temperature with respect to the coercive force of said first record and which is higher than the coercive force of said first record at temperatures of the order of room temperature, said first anhysteretically transferring step being carried out at a first temperature below room temperature where the coercive force of said master record is much lower than the coercive force of said first record; and
   (b) anhysteretically transferring the mirror image inverted signals on said master record to a third record, such second anhysteretic transferring step being carried out at a second temperature of the order of room temperature where the coercive force of said master record is much higher than the coercive force of said third record, thereby providing on said third record signals which are reinverted and have the same sense as the signals on said first record, said third record being a copy of said first record.

7. The invention as set forth in claim 6 further comprising the step of recording said signals on said first record with the aid of a magnetic head.

8. The invention as set forth in claim 6 wherein said first transferring step is carried out by establishing a first AC magnetic field in which said first and master records are disposed in magnetically coupled relation with each other, the intensity of said first field being greater than the coercive force of said master record at said first temperature, and wherein said second transferring step is carried out by establishing a second AC magnetic field in which said master record and said third record are disposed in magnetically coupled relationship with each other, the intensity of said second field being greater than the coercive force of said third record at said second temperature.

9. The invention as set forth in claim 8 wherein said first and second field intensities are from 3 to 10 times greater than the coercive force of said master record at said first temperature and said third record at said second temperature, respectively.

10. The invention as set forth in claim 6 wherein said first record, said master record and said third record are each magnetic tapes having a flexible substrate upon which a layer of magnetic material is fixedly disposed, wherein said first anhysteretic transfer step is preceded by the step of winding the master record tape and the first record tape with their layers in contact with each other such said first tape is wound on one side of said master, said first anhysteretic transfer step being carried out while said master and first tapes are so wound, and wherein said second anhysteretic transfer step is preceded by the step of winding said master tape and said third tape with their layers in contact with each other such that said third tape is wound on the same side of said master as said first tape, said second anhysteretic transfer step being carried out while said master and third tapes are so wound.

11. The invention as set forth in claim 6 wherein said master record has a layer containing MnBi in the form of fine particles less than 1 $\mu$m in their maximum dimension.

12. The invention as set forth in claim 11, wherein said MnBi particles average 0.33 $\mu$m in said maximum dimension.

13. The invention as set forth in either of claims 11 or 12 wherein said first temperature is a temperature below 170 K and said second temperature is at least 200 K.

14. The invention as set forth in claim 11 or 12 wherein said MnBi is an alloy containing MnBi in a ratio of from 5 to 6 moles Mn to from 4 to 5 moles Bi.

15. The invention as set forth in either of claims 11 or 12 wherein said first and third records each have a layer of magnetic material selected from the group consisting of:
   $\gamma$-$Fe_2O_3$ doped with Co in the range of 1% to 20% by weight;
   $Fe_3O_4$ doped with Co in the range of 1% to 20% by weight;
   $CrO_2$, and metal particles, said layer of said first record providing the recording medium thereof.

* * * * *